Dec. 11, 1956  C. E. GRINSTEAD ET AL  2,774,063
SEQUENTIAL CIRCUIT CONTROL DEVICE
Filed Feb. 5, 1954  2 Sheets-Sheet 1
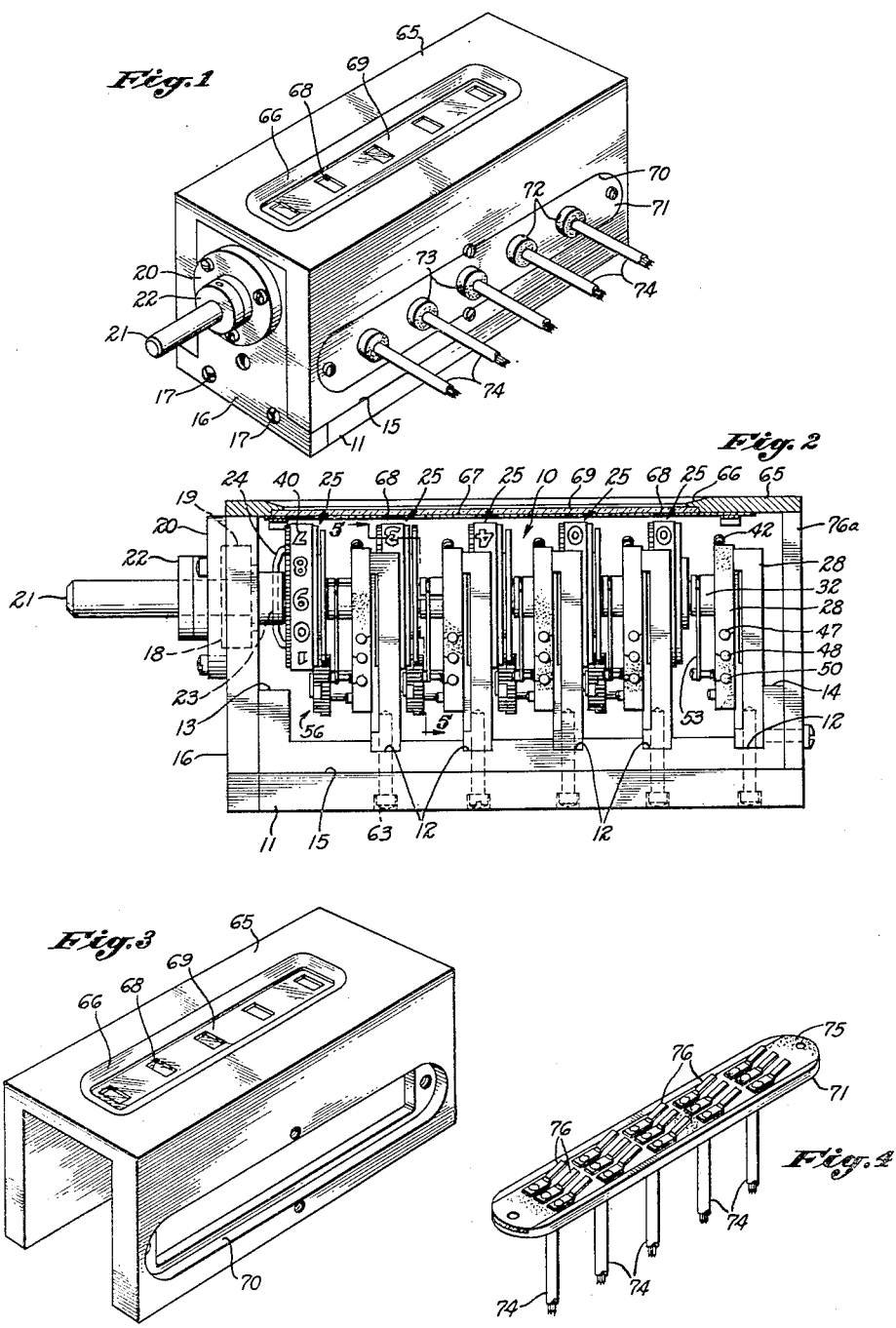
INVENTORS:
CARL E. GRINSTEAD
RENO W. PRICHARD
By D. Gordon Angus
ATTORNEY Dec. 11, 1956    C. E. GRINSTEAD ET AL    2,774,063
SEQUENTIAL CIRCUIT CONTROL DEVICE
Filed Feb. 5, 1954    2 Sheets-Sheet 2
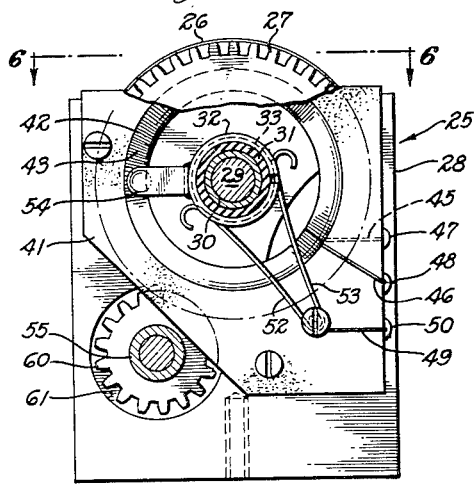
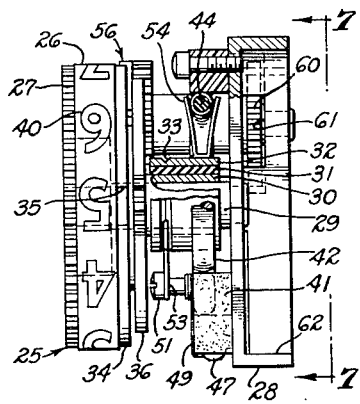
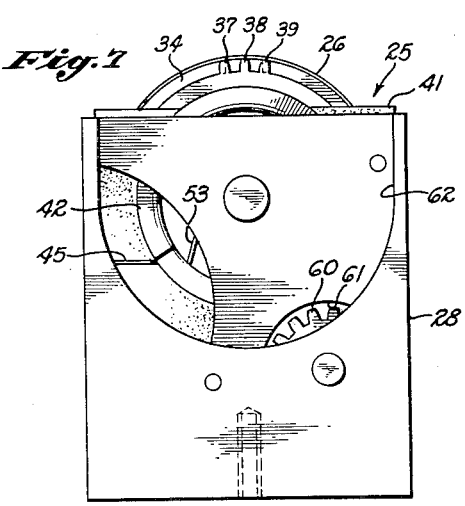
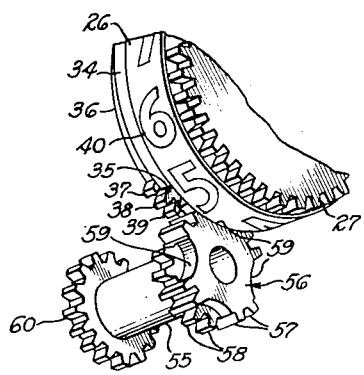
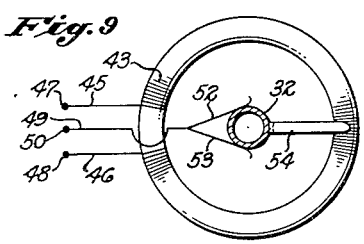
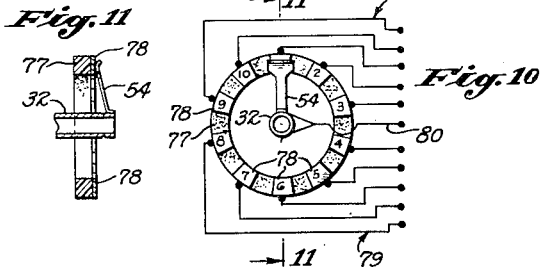
INVENTORS:
CARL E. GRINSTEAD
RENO W. PRICHARD
By D. Gordon Angus
ATTORNEY United States Patent Office 2,774,063
Patented Dec. 11, 1956

2,774,063

SEQUENTIAL CIRCUIT CONTROL DEVICE

Carl E. Grinstead, Altadena, and Reno W. Prichard, La Canada, Calif., assignors to Photocon Research Products, Pasadena, Calif., a corporation of California Application February 5, 1954, Serial No. 408,436

8 Claims. (Cl. 340—345)

This invention relates to devices for sequentially controlling electrical circuits.

An object of the invention is to provide such a device which can sequentially control with great accuracy a plurality of circuits according to a predetermined mathematical rule. An allied object is to provide means for visually determining the adjustment of the various circuits.

The invention is carried out by use of a plurality of counter elements, each having a counter wheel adapted to be rotated by external actuation. Each counter wheel has a counting radix whereby a full revolution of the counter wheel results from a number of unit actuations equal to the counting radix. The counter elements are mechanically interconnected so that a complete rotation of a counter wheel rotates the counter wheel of the next succeeding counter element by a unit of its counting radix. Circuit control means which may, if desired, be a potentiometer, are interconnected with each counter wheel so as to vary the circuit conditions as the counter wheels are turned.

A feature of the invention resides in the unitary construction of each counter unit, whereby a plurality of them may be easily and accurately positioned in interconnecting counting relationship by attachment to a base member, and so as to be easily removable and individually replaceable.

The above and other features of the invention will be fully understood from the following detailed description and the accompanying drawings, of which:

Fig. 1 is a perspective view of an assembled sequential circuit control device according to the invention;

Fig. 2 is a side elevation, partly in cross-section, of the device of Fig. 1;

Fig. 3 is a perspective view of the cover;

Fig. 4 is a perspective view of mounting means for leads;

Fig. 5 is a cross-section taken at line 5—5 of Fig. 2;

Fig. 6 is a top view, partly in section, taken at line 6—6 of Fig. 5;

Fig. 7 is a side elevation taken at line 7—7 of Fig. 6;

Fig. 8 is a fragmentary perspective view of driving means shown in Fig. 6;

Fig. 9 is a plan view partly in section of the potentiometer circuit of Fig. 6;

Fig. 10 is a plan view, partly in section, of an alternate contact unit; and

Fig. 11 is a cross-section taken at line 11—11 of Fig. 10.

Referring now to Fig. 2, a sequential circuit control device assembly 10 is shown mounted on a base plate 11. The base plate has five slots 12 in its upper surface, an upright flange 13, 14 at each end, and a shelf 15 extending around three of its sides. A bearing support plate 16 is affixed to one end of the base plate by screws 17, a ball bearing 18 being fitted in a counterbore 19 in the bearing support plate. A retainer plate 20 which is screw-mounted to the bearing support plate holds the bearing in place.

A primary drive shaft 21 is journaled in the ball bearing 18 and projects from both sides of the bearing support plate 16. There is a collar 22 pinned to it next to the retainer plate 20 for securing the shaft against movement to the right as shown in Fig. 2. The end of the shaft nearest the base plate has a hole 23 drilled transversely therethrough to accommodate a coupling member 24 which comprises a relatively rigid piece of wire.

This coupling 24 is attached to and provides external actuation means for the first of a series of fixed counter elements 25 which adjust a series of contact units. Since all of the counter units are alike, only one will be described in detail. The mechanism of such a counter element is shown in greater detail in Figs. 5 to 8 inclusive. With particular reference to Fig. 6, there is shown a counter wheel 26 connected to the drive shaft by the coupling and having counter wheel gear teeth 27 on its cylindrical surface at the edge nearest the primary drive shaft. In the embodiment shown, there are forty of these counter wheel gear teeth. This counter wheel is journaled in a support 28 which is fixed in one of the slots 12 of the base plate by a screw threaded upward through the base plate and into the support. These counter units are each individually constructed, and each is retained in its own slot 12. The counter wheel is rotatably mounted relative to the support by a central spindle 29 rigidly attached to the support. A ball bearing (not shown) fits between the spindle and the counter wheel to permit the wheel to rotate.

An insulating bushing 30 is attached to the counter wheel and surrounds the spindle. A shaft bushing 31 makes a close fit around the insulating bushing 30, and a conductive bushing 32 with a circumferential contactor groove 33 surrounds and rotates with the insulating bushing and shaft bushing.

Next to the side of the counter wheel nearest the support 28 there is an annular indexing ring 34 of lesser diameter than the counter wheel itself, with an indexing gap 35 at its outer periphery. Abutting against this indexing ring and the conductive bushing and concentric therewith there is an indexing gear 36 having three indexing gear teeth 37, 38, 39 on its periphery. The indexing gear is angularly placed so that the indexing gear teeth are next to the indexing gap 35. Both the indexing ring and the indexing gear are attached to the shaft bushing so that the gap and teeth rotate with the counter wheel. The counter wheel has a series of index numbers 40 on its periphery. As shown, there are ten numbers on each counter wheel, and ten is therefore the counting radix of this counter wheel. Actuation of the counter-wheel to turn it through an angle equal to 360° divided by the counting radix will turn the counting wheel by one unit. Turning the wheel through one complete revolution requires actuation by a number of units equal to the counting radix. In this embodiment, all counter wheels are shown with a counting radix of ten, although any other radix could be used as well. Also, all counter wheels need not have the same radix.

A coil base 41 which comprises a flat piece of insulating material such as phenolic micarta, with a disc-shaped cut-out at one edge, is fastened to the side of the support adjacent the counter wheel. A contact unit comprising a resistance coil 42 of a potentiometer is cemented inside the cut out of this coil base. The resistance element itself is a strand 43 of conductive wire continuously wound upon a ring 44 which is made of insulating material. The ends 45, 46 of the strand are brought out as leads to an edge of the coil base and are held there by fasteners 47, 48, each having a conductive head. A third lead 49 is held by a similar fastener 50 at the same edge and passes to a post 51 to which two springing contactors 52, 53 are soldered. The free ends of these contactors ride in the contactor groove 33 in conductive bushing 32. A wiper arm 54 is soldered to the outer surface of the conductive bushing so that it is turned by the counter wheel and makes a sliding contact with the resistance coil. The resistance coil is cemented to the coil base so that the area contacted by the wiper arm is free of cement or insulation. Thus a good electrical contact may be made between the wiper arm 54 and resistance coil 42. The fasteners 47, 48, 50 act as circuit terminals.

A counter drive shaft 55 (see Fig. 8) is journaled in the support 28. A partial gear 56 having sixteen teeth is fixed to the end of the counter drive shaft nearest the counter wheel. Each alternate pair of teeth on the partial gear is partially cut off to provide alternate pairs of teeth, long pairs 57, the teeth of which extend the full length of the gear, and short pairs 58, the teeth of which have cut out sections 59 at the end adjacent the counter wheel by the partial gear.

The partial gear is positioned so that the long teeth 57 ride along the outer periphery of the indexing ring 34 when the counter wheel is turned; that is, the indexing ring itself fits into a cut out section 59 so that long teeth on opposite ends of the cut out section abut against the indexing ring. The indexing gear 36 has a smaller radius than the indexing ring, and the shorter teeth 58 do not make contact with this indexing gear where there are no teeth on it.

At the end of the counter drive shaft 55 adjacent the support 28, there is a counter wheel drive gear 60 having sixteen teeth of the same outer radius and angular spacing as the long teeth on partial gear 56. This counter wheel drive gear is disposed in a cut-out portion 61 on one side of support 28. The support is also cut out on the other side as at 62 (see Fig. 7) so as to expose a few of the teeth of the counter wheel drive gear 60. This cut out 62 is of such dimensions as to accommodate the counter wheel 26 of the next succeeding counter element.

These teeth on the counter wheel drive gear continuously mesh with the counter wheel gear teeth 27 on the succeeding counter wheel. This counter wheel is attached to and forms part of a counter element similar to that which has just been described. It will thereby be appreciated that any number of such counter units may be likewise assembled in series relationship so as to give any desired counter capacity. These additional counter elements are fixed in slots 12 by screws 63 which pass upward through the base plate and into the counter element.

The assembly is enclosed by the provision of a U shaped cover 65. The cover has an opening 66 in the center of the top within which there is a plate 67 with windows 68 aligned with the numbers on the counter wheels. A strip 69 of transparent material is placed over the plate to exclude dust from the assembly.

Another opening 70 pierces the side of the cover adjacent to the terminals 47, 48, 50 at which opening a mounting plate 71 (see Fig. 4) may be fitted. This mounting plate has five holes 72 therethrough, this number of holes being equal to the number of counter elements. Bushings 73 of an insulating material such as rubber hold lead wires 74 in the holes 72. There will be a lead wire for each of the terminals 47, 48, 50. Fixed to the side of the plate and adapted to fit next to the counter units, that is, inside the cover, there is an insulating plate 75 of a stiff material such as Bakelite to serve as a support for contact leaves 76. Each contact leaf comprises a strip of conductive metal which is soldered to the end of one of the lead wires 74. These leaves are bent upward off the surface of the insulating plate 75 so as to make a springing contact with the terminals 47, 48, 50.

When the device is assembled, the cover encloses the top and long sides, and a plate 76a covers the end away from the primary drive shaft. The mounting plate is affixed at the opening 70 so that the leaves 76 contact the terminals and incorporate leads 74 into the potentiometer circuit.

Fig. 9 illustrates the electrical circuitry involved in each potentiometer. In each counter unit, there is a complete electrical circuit from terminal 47 through the coil 42 and out terminal 48. Terminal 50 leads to the spring contactors 52, 53 and thence to the wiper arm to complete a circuit of the well-known potentiometer type. It will be appreciated that any number of such circuits may be provided along with an equal number of counter elements. The leads from the circuits may be connected to any desired equipment circuits.

Figs. 10 and 11 show a form of electrical contact unit which may be used instead of the resistance coil 42, and which will be mounted in the same position as that coil. This alternate form comprises a base ring 77 made of an insulating material such as Bakelite with ten metallic inserts 78 embedded therein. There will ordinarily be a number of such inserts equal to the counting radix of its counter element. These inserts present exposed metallic surfaces which can be contacted by a wiper arm 54. A lead wire 79 is attached to each insert, thus providing a group of ten lead wires from each contact unit. These lead wires may then be connected to some desired equipment circuit. The circuit is completed by a lead 80 connecting to contactors 52, 53, and thereby to the conductive bushing 32 and the wiper arm 54. The wiper arm makes a sliding contact with the metallic inserts. If desired, the wiper arm may be wide enough to contact two inserts at once.

The operation of the control assembly of Figs. 1–9 will now be described. The purpose of the assembly is to adjust the wiper arms at positions on the resistance coils 42 so as to provide various desired potentials at the leads 74 within the range of the potentiometers. At the same time the numbers 40 are visible through windows 68 so that the setting of the various elements will be readable and the condition of the assembly may be evaluated at a glance. Each coil is a separate potentiometer adaptable to control some external circuit. The counting train is adapted to control the successive potentiometers in a sequential manner according to some mathematical law or regime. In the illustrated case, the law is that of a decimal counting relationship; that is, each counter element has a counting radix of ten.

The means of setting the various counter wheels is by turning the primary drive shaft 21 to rotate the left hand counter wheel 26 as seen in Fig. 2. It will be recognized that the unit actuation of this first counter wheel is a continuous action, while the unit actuation of succeeding counter wheels is a step-by-step operation.

Turning the counter wheel moves wiper arm 54 along the potentiometer coil, and the unit numerals on the counter wheels successively appear in the window to indicate the setting of the wiper arm.

As the numeral 9 leaves a position by a window, and zero approaches it, the indexing gear approaches the partial gear 36 as shown in Fig. 8. At this time gear tooth 39 engages one of the short teeth 58 and starts to turn the partial gear. The long teeth 57 on the partial gear 56 can, at this position, be inserted into the gap 35 on indexing ring 34. This insertion of these teeth permits the partial gear to turn further, and the three index teeth 37, 38, 39 on indexing gear 36 will mesh with teeth on the partial gear and turn the counter drive shaft 35. This actuation resulting from the intermittent meshing turns the counter drive shaft through the angle subtended by four teeth on the counter wheel drive gear. That is, the turning of forty teeth on the counter wheel has caused the counter drive shaft to turn four teeth on the partial gear, and also on the counter wheel drive gear 60. When the indexing gear has passed the partial gear 56, the partial gear again stands in a position relative to the counter wheel as illustrated in Fig. 8 so that it is locked against further rotation by contact between the indexing ring (whose gap 35 has moved away from the partial gear) and two long teeth 57 on the extreme ends of a cut-out 59. A similar actuation occurs after the counter wheel makes another complete revolution. If the counter wheel is turned in the opposite direction, the mechanical interactions will be the same, but the wiper arm will be turned in the opposite direction.

The turning of the four teeth on the counter wheel drive gear has caused the next counter wheel to the right in Fig. 2 also to move by four teeth, which for that counter wheel is equivalent to one-tenth of a revolution and is an external actuation for driving that counter element. In this case, the one-tenth of a revolution is equal to one unit of its counting radix of ten. This one-tenth of a revolution of the counterwheel also moves the wiper arm associated with that counter wheel, one tenth of a full circle along the circumference of its coil, thus varying the potential at the leads 74.

When a preceding counter wheel has made ten complete revolutions, the succeeding counter wheel and its wiper arm will have been actuated by ten units, or one complete revolution itself, and will thereupon actuate its own counter drive shaft to turn a succeeding counter wheel one unit of its counting radix, which in the illustration is one-tenth of a revolution. It will now be appreciated how this sequential effect can be transmitted through any number of such counter elements to control any desired number of circuits.

As the wiper arms move along the coil surfaces, they vary the voltage between terminals 47 and 50 and between terminals 48 and 50, according to the well-known action of potentiometers, and therefore vary the potentials at leads 74. When the annular contact unit 77 of Figs. 10 and 11 is substituted for coil 42 in a counter element, the counter action and wiper arm movement is exactly the same. However, the metal inserts which are contacted by the wiper arms act to complete one circuit among the ten leads at a time through the lead wire 80, conductive bushing 32 and wiper arm 54. This alternate device acts to complete successive circuits rather than to continuously vary a potential. If the wiper arm is made slightly wider than the gap between two adjacent inserts, there need never be an open circuit, since for a moment the wiper arm may contact two inserts at one time.

The counter assembly has been illustrated to show a decimal relationship between successive counting units and their associated potentiometer circuits. While this is convenient for some purposes, it may be that the control of various circuits should be in accordance with some numerical ratio other than decimal. Perhaps several different ratios might be desired in the same assembly. In such an event, the construction and arrangement of the drive gears and shafts would be the same, but the gear ratios would be different so that each unit actuation turns the succeeding counter wheel through an angle corresponding to one unit of the counting radix of that succeeding counter wheel. For example, if a binary relationship is desired between a first and a second counter element, the first counter element will be so geared to the second as to give the second a half turn each actuation instead of the one-tenth turn for decimal relationship.

The supports 28 and the slots 12 into which they fit completely and accurately determine the position of the counter elements. By providing these counter elements as separate units which are individually affixed in the slots as described, a device results in which the mechanism is easy to disassemble, service, and reassemble with the high degree of accuracy required for its proper operation. Also, any or all counter elements may easily be replaced by substitute elements, or with elements having different counting radixes if desired, which provides a degree of flexibility in usefulness which has hitherto been unknown in sequential control devices.

This unitary construction wherein individual counting elements are installed in position determining slots has the further advantage of a complete flexibility of capacity. Future capacity may be provided for simply by lengthening the base and making more slots therein, since it is not necessary that all slots be filled. When more counter elements are desired, they are simply inserted in the vacant slots nearest the primary drive shaft. It will be appreciated that any desired number may be connected in this manner.

This invention therefore provides a device for the sequential control of electrical circuits in accordance with some desired numerical law, which incorporates a convenient read-out for the value of the settings, and which is flexible in use and simple to service.

The invention is not to be limited by the embodiments shown in the drawings and described in the description, which are given by way of illustration and not of limitation, but only in accordance with the scope of the append claims.

We claim:

1. A sequential circuit control device comprising a base plate, a plurality of individual counter elements, a support for each counter element affixed to the base plate, a counter wheel in each counter element having peripheral counter wheel gear teeth and adapted to be rotated by external actuation, each counter wheel having a counting radix, a full revolution of the counter wheel resulting from a number of unit actuations equal to the counting radix, each unit actuation causing a rotation of the counter wheel through an angle of 360° divided by the counting radix, an indexing gear concentric with and rotated by the counter wheel, indexing gear teeth on only a portion of the indexing gear, preceding and succeeding counter elements being mechanically interconnected through their counter wheels by gearing means each of which gearing means comprises a counter drive shaft between adjacent counter elements, a partial gear on the counter drive shaft driven by intermittent meshing with the indexing gear teeth of a preceding counter wheel, and a counter wheel drive gear meshing continuously with the counter wheel drive gear teeth of a succeeding counter wheel, each of said gearing means connecting only one pair of counter elements, and being mounted independently of any other similar gearing means, whereby a preceding counter wheel, on substantially completing one full revolution causes the indexing gear teeth to mesh with the partial gear to turn the counter drive shaft to actuate the counter wheel of a succeeding counter element by one unit of the succeeding counter wheel's counting radix when the preceding counter wheel has completed one full revolution, a wiper arm and a contact unit for each counter wheel, the contact unit being fixed with respect to each counter element, and the wiper arm being rotated by the counter wheel and making a sliding contact with the contact unit, whereby an electrical circuit may be completed from each wiper arm to the contact unit.

2. Apparatus according to claim 1 in which the contact units are continuously wound resistance coils.

3. Apparatus according to claim 1 in which the contact units are continuously wound resistance coils and the counting radix of the counter elements is ten.

4. Apparatus according to claim 1 in which the contact units are bases having metallic inserts therein which are adapted to be contacted by the wiper arms.

5. Apparatus according to claim 3 in which leads make contact with the ends of the coils and with conductive means for contacting the wiper arms to form a potentiometer circuit.

6. Apparatus according to claim 1 in which each support is fitted in an individual slot in the base plate and retained therein by fastening means, thereby establishing the position of the counter element.

7. Apparatus according to claim 1 in which each counter wheel has an indexing ring with an indexing gap in its periphery, the indexing ring being rotated by the counter wheel, and the gap being disposed adjacent the indexing gear teeth, said partial gear having alternate pairs of long and short teeth, a portion of a pair of the long teeth being insertable into the indexing gap when the partial gear meshes with the indexing gear teeth.

8. Apparatus according to claim 7 in which each support is fitted in an individual slot in the base plate and retained therein by fastening means, thereby establishing the position of the counter element.

References Cited in the file of this patent

UNITED STATES PATENTS

| | | |
|---|---|---|
| 2,295,533 | Leathers | Sept. 15, 1942 |
| 2,344,254 | Leathers et al. | Mar. 14, 1944 |
| 2,469,655 | Leathers | May 10, 1949 |